(12) United States Patent
Shepard et al.

(10) Patent No.: US 7,436,797 B2
(45) Date of Patent: Oct. 14, 2008

(54) WIRELESS ARCHITECTURE AND SUPPORT FOR PROCESS CONTROL SYSTEMS

(75) Inventors: John R. Shepard, Austin, TX (US); Joe Nelson, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 340 days.

(21) Appl. No.: 11/156,215

(22) Filed: Jun. 17, 2005

(65) Prior Publication Data

US 2005/0276233 A1 Dec. 15, 2005

(51) Int. Cl.
H04L 12/28 (2006.01)
(52) U.S. Cl. .................. 370/328; 370/254; 370/401
(58) Field of Classification Search .............. 370/328, 370/401; 455/414.1, 414
See application file for complete search history.

(56) References Cited

U.S. PATENT DOCUMENTS

| | | | |
|---|---|---|---|
| 5,682,476 A | 10/1997 | Tapperson et al. | |
| 5,793,963 A | 8/1998 | Tapperson et al. | |
| 6,199,018 B1 * | 3/2001 | Quist et al. | 702/34 |
| 6,246,320 B1 * | 6/2001 | Monroe | 340/506 |
| 6,775,707 B1 | 8/2004 | Bennett et al. | |
| 6,970,183 B1 * | 11/2005 | Monroe | 348/143 |
| 2002/0125998 A1 * | 9/2002 | Petite et al. | 340/286.01 |
| 2002/0130846 A1 | 9/2002 | Nixon et al. | |
| 2003/0043052 A1 | 3/2003 | Tapperson et al. | |
| 2003/0099221 A1 * | 5/2003 | Rhee | 370/338 |
| 2003/0171827 A1 | 9/2003 | Keyes et al. | |
| 2004/0015609 A1 * | 1/2004 | Brown et al. | 709/246 |
| 2004/0103165 A1 | 5/2004 | Nixon et al. | |
| 2004/0260405 A1 | 12/2004 | Eddie et al. | |
| 2005/0062677 A1 | 3/2005 | Nixon et al. | |
| 2005/0130605 A1 | 6/2005 | Karschnia et al. | |
| 2005/0276233 A1 | 12/2005 | Shepard et al. | |
| 2006/0077917 A1 * | 4/2006 | Brahmajosyula et al. | 370/310 |

FOREIGN PATENT DOCUMENTS

| | | |
|---|---|---|
| JP | 2001-36542 | 2/2001 |
| WO | WO-01/35190 | 5/2001 |
| WO | WO-04/109984 | 12/2004 |

OTHER PUBLICATIONS

Search Report for Application No. GB0611940.8, dated Sep. 21, 2006.

* cited by examiner

*Primary Examiner*—CongVan Tran
(74) *Attorney, Agent, or Firm*—Marshall, Gerstein & Borun LLP

(57) ABSTRACT

A wireless communication system for use in a process environment uses mesh and possibly a combination of mesh and point-to-point communications to produce a wireless communication network that can be easily set up, configured, changed and monitored, thereby making a wireless communication network that is less expensive, and more robust and reliable. The wireless communication system allows virtual communication paths to be established and used within the process control system in a manner that is independent of the manner in which the wireless signals are sent between different wireless transmitting and receiving devices within the process plant, to thereby operate in a manner that is independent of the specific messages or virtual communication paths within the process plant. Still further, communication analysis tools are provided to enable a user or operator to view the operation of the wireless communication network to thereby analyze the ongoing operation of the wireless communications within the wireless communication network.

45 Claims, 7 Drawing Sheets

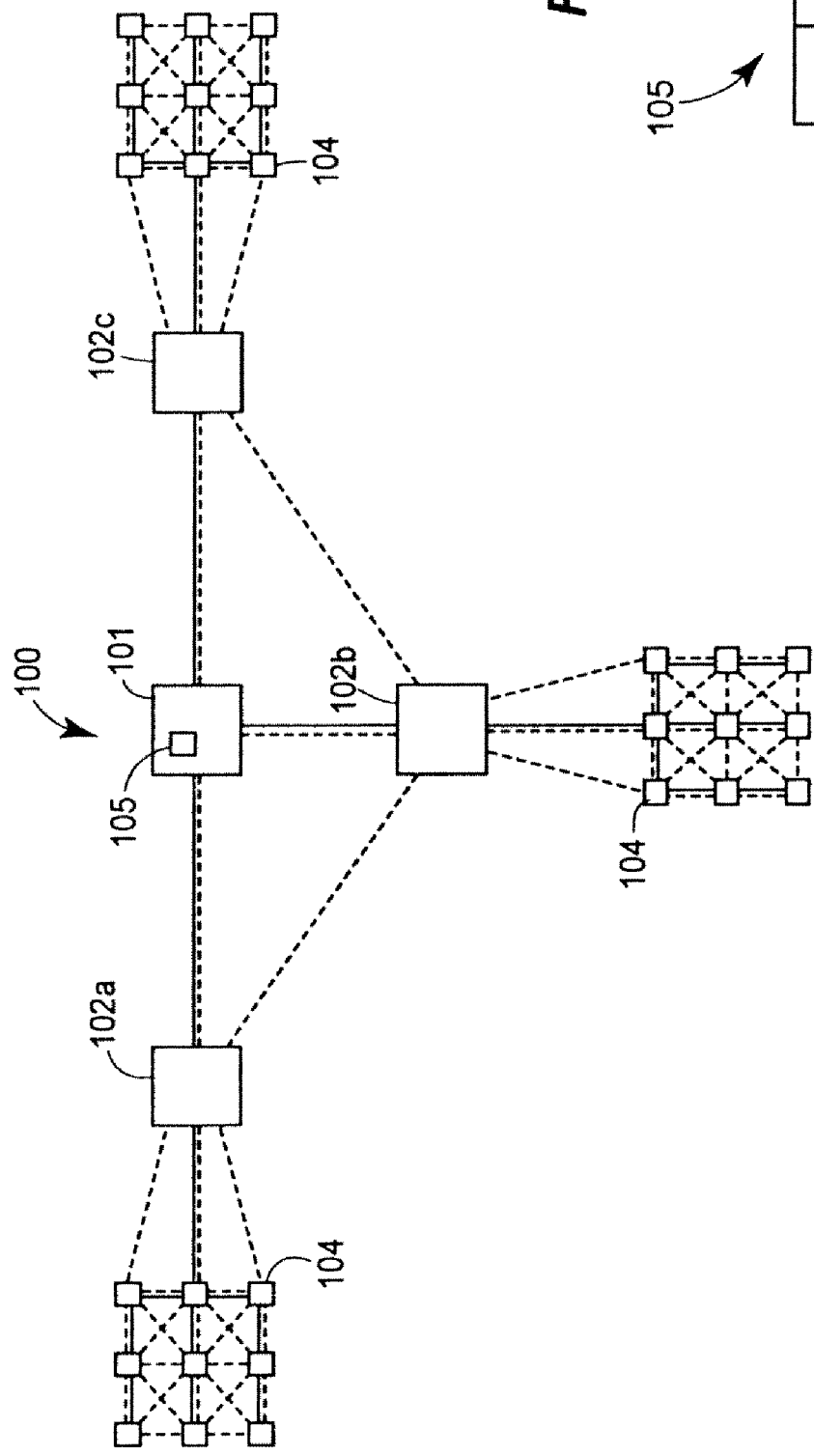
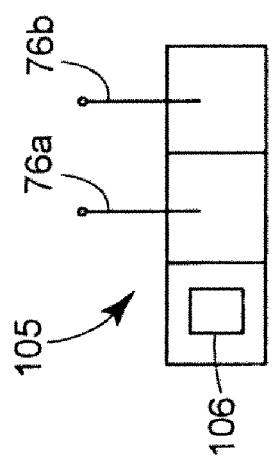

Wireless TOPOLOGY had 9 nodes

```
BA  :  03  04  05  07  08  09  0A  0B
03  :  04  BA  05  07  08  09  0A  0B
04  :  BA  05  (07) 08  (09) 0A  0B  03
05  :  07  08  09  (0A)(0B) BA  03  04
07  :  (04)(05)(08) 09  0A  0B  BA  03
08  :  09  0A  0B  BA  03  04  07  05
09  :  0A  0B  BA  03  04  07  05  08
0A  :  0B  BA  (03) 04  07  (05)(08) 09
0B  :  BA  03  04  07  08  09  0A
```

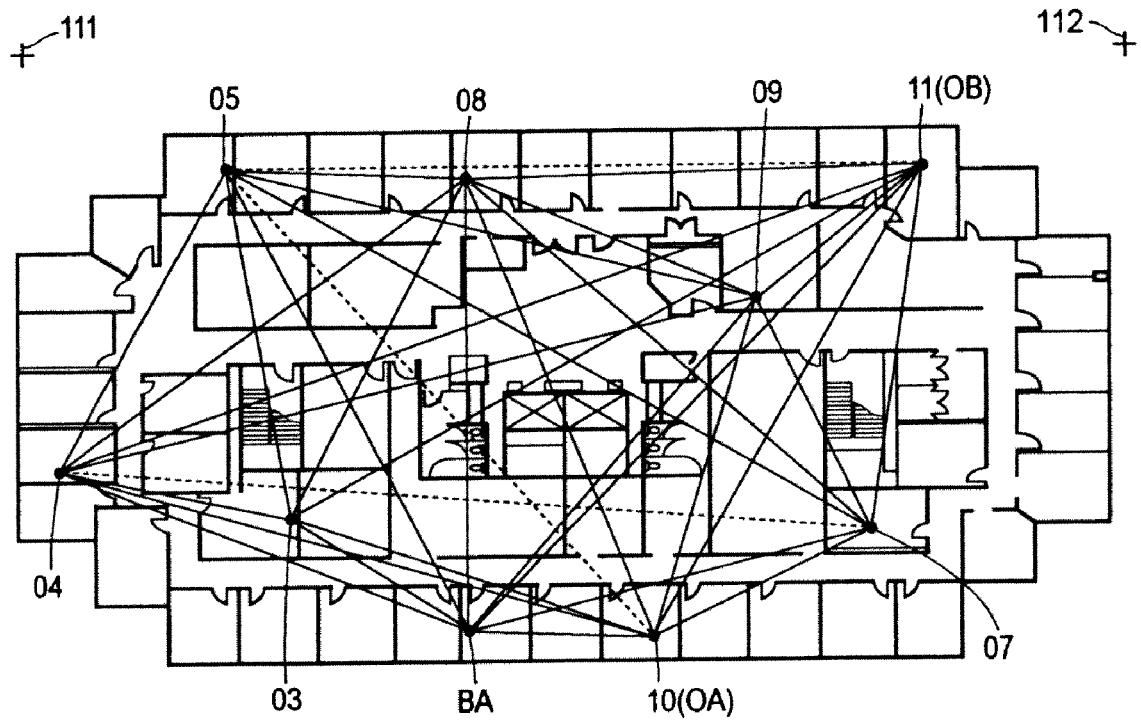

WIRELESS ARCHITECTURE AND SUPPORT FOR PROCESS CONTROL SYSTEMS

FIELD OF TECHNOLOGY

Methods and apparatuses are disclosed for providing wireless communications within a distributed process control system which establish and maintain consistent wireless communication connections between different remote devices and a base computer in a process control system.

BACKGROUND

Process control systems are widely used in factories and/or plants in which products are manufactured or processes are controlled (e.g., chemical manufacturing, power plant control, etc.). Process control systems are also used in the harvesting of natural resources such as, for example, oil and gas drilling and handling processes, etc. In fact, virtually any manufacturing process, resource harvesting process, etc. can be automated through the application of one or more process control systems. It is believed the process control systems will eventually be used more extensively in agriculture as well.

The manner in which process control systems are implemented has evolved over the years. Older generations of process control systems were typically implemented using dedicated, centralized hardware and hard-wired connections.

However, modern process control systems are typically implemented using a highly distributed network of workstations, intelligent controllers, smart field devices, and the like, some or all of which may perform a portion of an overall process control strategy or scheme. In particular, most modern process control systems include smart field devices and other process control components that are communicatively coupled to each other and/or to one or more process controllers via one or more digital data buses. In addition to smart field devices, modern process control systems may also include analog field devices such as, for example, 4-20 milliamp (mA) devices, 0-10 volts direct current (VDC) devices, etc., which are typically directly coupled to controllers as opposed to a shared digital data bus or the like.

In a typical industrial or process plant, a distributed control system (DCS) is used to control many of the industrial processes performed at the plant. The plant may have a centralized control room having a computer system with user input/output (I/O), a disc I/O, and other peripherals known in the computing art with one or more process controllers and process I/O subsystems communicatively connected to the centralized control room. Additionally, one or more field devices are typically connected to the I/O subsystems and to the process controllers to implement control and measurement activities within the plant. While the process I/O subsystem may include a plurality of I/O ports connected to the various field devices throughout the plant, the field devices may include various types of analytical equipment, silicon pressure sensors, capacitive pressure sensors, resistive temperature detectors, thermocouples, strain gauges, limit switches, on/off switches, flow transmitters, pressure transmitters, capacitance level switches, weigh scales, transducers, valve positioners, valve controllers, actuators, solenoids, indicator lights or any other device typically used in process plants.

As used herein, the term "field device" encompasses these devices, as well as any other device that performs a function in a control system. In any event, field devices may include, for example, input devices (e.g., devices such as sensors that provide status signals that are indicative of process control parameters such as, for example, temperature, pressure, flow rate, etc.), as well as control operators or actuators that perform actions in response to commands received from controllers and/or other field devices.

Traditionally, analog, field devices have been connected to the controller by two-wire twisted pair current loops, with each device connected to the controller by a single two-wire twisted pair. Analog field devices are capable of responding to or transmitting an electrical signal within a specified range. In a typical configuration, it is common to have a voltage differential of approximately 20-25 volts between the two wires of the pair and a current of 4-20 mA running through the loop. An analog field device that transmits a signal to the control room modulates the current running through the current loop, with the current being proportional to the sensed process variable.

An analog field device that performs an action under control of the control room is controlled by the magnitude of the current through the loop, which current is modulated by the I/O port of the process I/O system, which in turn is controlled by the controller. Traditional two-wire analog devices having active electronics can also receive up to 40 milliwatts of power from the loop. Analog field devices requiring more power are typically connected to the controller using four wires, with two of the wires delivering power to the device. Such devices are known in the art as four-wire devices and are not power limited, as typically are two-wire devices.

A discrete field device can transmit or respond to a binary signal. Typically, discrete field devices operate with a 24 volt signal (either AC or DC), a 110 or 240 volt AC signal, or a 5 volt DC signal. Of course, a discrete device may be designed to operate in accordance with any electrical specification required by a particular control environment. A discrete input field device is simply a switch which either makes or breaks the connection to the controller, while a discrete output field device will take an action based on the presence or absence of a signal from the controller.

Historically, most traditional field devices have had either a single input or a single output that was directly related to the primary function performed by the field device. For example, the only function implemented by a traditional analog resistive temperature sensor is to transmit a temperature by modulating the current flowing through the two-wire twisted pair, while the only function implemented by a traditional analog valve positioner is to position a valve somewhere between a fully open and a fully closed position based on the magnitude of the current flowing through the two-wire twisted pair.

More recently, field devices that are part of hybrid systems become available that superimpose digital data on the current loop used to transmit analog signals. One such hybrid system is known in the control art as the Highway Addressable Remote Transducer (HART) protocol. The HART system uses the magnitude of the current in the current loop to send an analog control signal or to receive a sensed process variable (as in the traditional system), but also superimposes a digital carrier signal upon the current loop signal. The HART protocol makes use of the Bell 202 Frequency Shift Keying (FSK) standard to superimpose the digital signals at a low level on top of the 4-20 mA analog signals. This enables two-way field communication to take place and makes it possible for additional information beyond just the normal process variable to be communicated to/from a smart field instrument. The HART protocol communicates at 1200 bps without interrupting the 4-20 mA signal and allows a host application (master) to get two or more digital updates per second from a field device. As the digital FSK signal is phase continuous, there is no interference with the 4-20 mA signal.

The FSK signal is relatively slow and can therefore provide updates of a secondary process variable or other parameter at a rate of approximately 2-3 updates per second. Generally, the digital carrier signal is used to send secondary and diagnostic information and is not used to realize the primary control function of the field device. Examples of information provided over the digital carrier signal include secondary process variables, diagnostic information (including sensor diagnostics, device diagnostics, wiring diagnostics, and process diagnostics), operating temperatures, a sensor temperature, calibration information, device ID numbers, materials of construction, configuration or programming information, etc. Accordingly, a single hybrid field device may have a variety of input and output variables and may implement a variety of functions.

More recently, a newer control protocol has been defined by the Instrument Society of America (ISA). The new protocol is generally referred to as Fieldbus, and is specifically referred to as SP50, which is as acronym for Standards and Practice Subcommittee 50. The Fieldbus protocol defines two subprotocols. An H1 Fieldbus network transmits data at a rate up to 31.25 kilobits per second and provides power to field devices coupled to the network. An H2 Fieldbus network transmits data at a rate up to 2.5 megabits per second, does not provide power to field devices connected to the network, and is provided with redundant transmission media. Fieldbus is a nonproprietary open standard and is now prevalent in the industry and, as such, many types of Fieldbus devices have been developed and are in use in process plants. Because Fieldbus devices are used in addition to other types of field devices, such as HART and 4-20 mA devices, with a separate support and I/O communication structure associated with each of these different types of devices.

Newer smart field devices, which are typically all digital in nature, have maintenance modes and enhanced functions that are not accessible from or compatible with older control systems. Even when all components of a distributed control system adhere to the same standard (such as the Fieldbus standard), one manufacturer's control equipment may not be able to access the secondary functions or secondary information provided by another manufacturer's field devices.

Thus, one particularly important aspect of process control system design involves the manner in which field devices are communicatively coupled to each other, to controllers and to other systems or devices within a process control system or a process plant. In general, the various communication channels, links and paths that enable the field devices to function within the process control system are commonly collectively referred to as an input/output (I/O) communication network.

The communication network topology and physical connections or paths used to implement an I/O communication network can have a substantial impact on the robustness or integrity of field device communications, particularly when the I/O communications network is subjected to environmental factors or conditions associated with the process control system. For example, many industrial control applications subject field devices and their associated I/O communication networks to harsh physical environments (e.g., high, low or highly variable ambient temperatures, vibrations, corrosive gases or liquids, etc.), difficult electrical environments (e.g., high noise environments, poor power quality, transient voltages, etc.), etc. In any case, environmental factors can compromise the integrity of communications between one or more field devices, controllers, etc. In some cases, such compromised communications could prevent the process control system from carrying out its control routines in an effective or proper manner, which could result in reduced process control system efficiency and/or profitability, excessive wear or damage to equipment, dangerous conditions that could damage or destroy equipment, building structures, the environment and/or people, etc.

In order to minimize the effect of environmental factors and to assure a consistent communication path, I/O communication networks used in process control systems have historically been hardwired networks, with the wires being encased in environmentally protected materials such as insulation, shielding and conduit. Also, the field devices within these process control systems have typically been communicatively coupled to controllers, workstations, and other process control system components using a hardwired hierarchical topology in which non-smart field devices are directly coupled to controllers using analog interfaces such as, for example, 4-20 mA, 0-10 VDC, etc. hardwired interfaces or I/O boards. Smart field devices, such as Fieldbus devices, are also coupled via hardwired digital data busses, which are coupled to controllers via smart field device interfaces.

While hardwired I/O communication networks can initially provide a robust I/O communication network, their robustness can be seriously degraded over time as a result of environmental stresses (e.g., corrosive gases or liquids, vibration, humidity, etc.). For example, contact resistances associated with the I/O communication network wiring may increase substantially due to corrosion, oxidation and the like. In addition, wiring insulation and/or shielding may degrade or fail, thereby creating a condition under which environmental electrical interference or noise can more easily corrupt the signals transmitted via the I/O communication network wires. In some cases, failed insulation may result in a short circuit condition that results in a complete failure of the associated I/O communication wires.

Additionally, hardwired I/O communication networks are typically expensive to install, particularly in cases where the I/O communication network is associated with a large industrial plant or facility that is distributed over a relatively large geographic area, for example, an oil refinery or chemical plant that consumes several acres of land. In many instances, the wiring associated with the I/O communication network must span long distances and/or go through, under or around many structures (e.g., walls, buildings, equipment, etc.) Such long wiring runs typically involve substantial amounts of labor, material and expense. Further, such long wiring runs are especially susceptible to signal degradation due to wiring impedances and coupled electrical interference, both of which can result in unreliable communications.

Moreover, such hardwired I/O communication networks are generally difficult to reconfigure when modifications or updates are needed. Adding a new field device typically requires the installation of wires between the new field device and a controller. Retrofitting a process plant in this manner may be very difficult and expensive due to the long wiring runs and space constraints that are often found in older process control plants and/or systems. High wire counts within conduits, equipment and/or structures interposing along available wiring paths, etc., may significantly increase the difficulty associated with retrofitting or adding field devices to an existing system. Exchanging an existing field device with a new device having different field wiring requirements may present the same difficulties in the case where more and/or different wires have to be installed to accommodate the new device. Such modifications may often result in significant plant downtime.

It has been suggested to use wireless I/O communication networks to alleviate some of the difficulties associated with hardwired I/O networks. For example, Tapperson et al., U.S.

patent application Ser. No. 09/805,124 discloses a system which provides wireless communications between controllers and field devices to augment or supplement the use of hardwired communications. However, most, if not all, wireless I/O communication networks actually implemented within process plants today are implemented using relatively expensive hardware devices (e.g., wireless enabled routers, hubs, switches, etc.), most of which consume a relatively large amount of power. Further, intermittent interferences, such as the passing of trucks, trains, environmental or whether related conditions, etc., make wireless communication networks unreliable and therefore problematic.

In addition, known wireless I/O communication networks, including the hardware and software associated therewith, generally use point-to-point communication paths that are carefully selected during installation and fixed during subsequent operation of the system. Establishing fixed communication paths within these wireless I/O communication networks typically involves the use of one or more experts to perform an expensive site survey that enables the experts to determine the types and/or locations of the transceivers and other communication equipment. Further, once the fixed point-to-point communication paths have been selected via the site survey results, one or more of the experts must then configure equipment, tune antennas, etc. While the point-to-point paths are generally selected to insure adequate wireless communications, changes within the plant, such as the removal or addition of equipment, walls, or other structures may make the initially selected paths less reliable, leading to unreliable wireless communications.

While wireless I/O communication networks can, for example, alleviate the long term robustness issues associated with hardwired communication paths, these wireless I/O communication networks are relatively inflexible and are considered by most in the process control industry to be too unreliable to perform important or necessary process control functions. For example, there is currently no easy manner of telling when a wireless communication is no longer functioning properly, or has degraded to the point that communications over the wireless link are likely to be unreliable or to cease altogether. As a result, current process control operators have very little faith in wireless communication networks when implemented for important and necessary process control functions.

Thus, due to the costs associated with installing a wireless I/O communication network (e.g., site surveys, expert configuration, etc.), and the relative little amount of faith that current process control system operators have in wireless communications, wireless I/O communication networks are often cost prohibitive for what they provide, particularly for relatively large process control systems such as those typically used in industrial applications.

SUMMARY OF THE DISCLOSURE

A wireless communication architecture for use in a process control system is disclosed which includes the use of mesh and possibly a combination of mesh and point-to-point communications to produce a more robust wireless communication network that can be easily set up, configured, changed and monitored, to thereby make the wireless communication network more robust, less expensive and more reliable. The wireless communication architecture is implemented in a manner that is independent of the specific messages or virtual communication paths within the process plant and, in fact, the wireless communication network is implemented to allow virtual communication paths to be established and used within the process control system in a manner that is independent of the manner in which the wireless signals are sent between different wireless transmitting and receiving devices within the process plant.

In a refinement, one or more environmental nodes are used to control and optimize the operation of the wireless communication network. The environmental node(s) are linked to field "environmental" devices providing signals indicative of one or more environmental factors such as temperature, barometric pressure, humidity, rainfall and radio frequency (RF) ambient noise, amongst other environmental factors that could alter the operation of the network.

In another refinement, the network includes a main controller linked to a wireless card. The wireless card is in communication with a repeater node which, in turn, is in communication with a field node. The field node is linked to a plurality of field devices. In another refinement, the repeater node is eliminated. In another refinement, an environmental node and environmental detection devices as discussed above are incorporated with or without one or more repeater nodes. In a further refinement, the field and environmental nodes include a plurality of ports for communication with the field devices.

In a refinement, the wireless communication network is set up to transmit HART communication signals between different devices within the process plant to thereby enable a robust wireless communication network to be used in a process plant or any other environment having HART capable devices.

In an embodiment, a process control wireless communication network is disclosed which comprises a base node, a field node, an environmental node and a host. The base node is communicatively coupled to the host. The base, field and environmental nodes each comprising a wireless conversion unit and a wireless transceiver. The wireless transceivers of the base, the field and environmental nodes effect wireless communication among the base, field and environmental nodes. The field node comprises at least one field device providing process controlled data. The environmental node comprises at least one field device providing data regarding environmental factors that may effect operation of the wireless communication network.

In a refinement, the network also comprises a repeater node comprising a wireless conversion unit in a wireless transceiver. The repeater node effects wireless communications amongst the base, field and environmental node.

In another refinement, the environmental node comprises a plurality of field devices, each providing data selected from the group consisting of temperature, barometric pressure, humidity, rainfall and radio frequency ambient noise.

In another refinement, at least some of the field devices are HART protocol devices. In another refinement, at least some of the field devices are FIELDBUS™ protocol devices.

In another refinement, the network comprises a plurality of environmental nodes strategically placed about a process area for communicating environmental data for different locations within the process area.

In a refinement, the base, environmental and field nodes form a mesh communications network, providing multiple communication pathway options between any two wireless nodes. In another refinement, the base, environmental and field nodes form a point-to-point communications network. In yet another refinement, the network comprises a switch device to convert the base, environmental and field nodes from a mesh communications network to a point-to-point communications network and vice versa.

Communication tools are also disclosed to enable an operator to view a graphic of the wireless communication system to easily determine the actual wireless communication paths established within a process plant, to determine the strength of any particular path and to determine or view the ability of signals to propagate through the wireless communication network from a sender to a receiver to thereby enable a user or operator to assess the overall operational capabilities of the wireless communication network.

In a refinement, the communication tools include one or more of graphical topology maps illustrating connectivity between nodes, tabular presentations showing the connectivity matrix and hop counts and actual maps showing location and connectivity of the hardware devices. The monitor that illustrates wireless communications between the base, field and environmental nodes of the network may be associated with the base node or the host. In another refinement, the topology screen display also illustrates structural features of the process area or environment in which the base, field and environmental nodes are disposed. In another refinement, the host is programmed to provide a tabular screen display listing hop counts for communications between the various nodes of the network.

In another refinement, the wireless communication network is configured to transmit Fieldbus communication signals between different devices within the process plant to thereby enable a robust wireless communication network to be used in a process plant or environment having Fieldbus capable devices in combination with or instead of HART capable devices.

In a refinement, a method for controlling a process is disclosed which comprises receiving field data from at least one field device, transmitting the field data wirelessly from a field node to a base node, converting the field data to a different protocol, transmitting the field data of the different protocol to a routing node, determining at the routing node an object device for receiving the field data of the different protocol, sending the field data of the different protocol to the object device.

In another refinement, a method for monitoring a wireless process control network is disclosed which comprises receiving environmental data from one or more environmental field devices of an environmental node, wirelessly transmitting the environmental data to a base node, transmitting the environmental data to a host, interpreting the environmental data at the hose, sending a command from the host to the base node to adjust at least one operating perimeter of the wireless network based upon the environmental data, transmitting the command from the base node to at least one field node comprising at least one field device for executing said command.

Other advantages and features will be come apparent upon reading the following detailed description and independent claims, an upon reference to the accompanying drawings.

BRIEF DESCRIPTION OF THE DRAWINGS

For more complete understanding of this disclosure, reference should not be made to the embodiments illustrated in greater detail in the accompanying drawings and described below by way of examples. In the drawings:

FIG. 3 is a diagram of a wireless communication network within a process environment illustrating both mesh and point-to-point wireless communications;

FIG. 4 is a block diagram of a mesh and point-to-point enabled communication device that may be used to switch between mesh and point-to-point communications within the communication network of FIG. 3.

FIG. 7 is an example of a topology screen display created by a disclosed wireless network analysis tool illustrating the wireless communications within a graphic of a plant layout to enable an operator or other user to view the specific communications occurring within the wireless communication network and potential physical obstacles presented by the plant layout;

FIG. 8 is an example screen display created by a disclosed wireless network analysis tool allowing a user or operator to specify the channel routing and identification within the wireless communication network;

It should be understood that the drawings are not to scale and that the embodiments are illustrated by graphic symbol, phantom lines, diagrammatic representations and fragmentary views. In certain instances, details have been omitted which are not necessary for an understanding of the disclosed embodiments and methods or which render other details difficult to perceive. This disclosure is not limited to the particular embodiments illustrated herein.

DETAILED DESCRIPTION OF PREFERRED EMBODIMENTS

Figure 1:
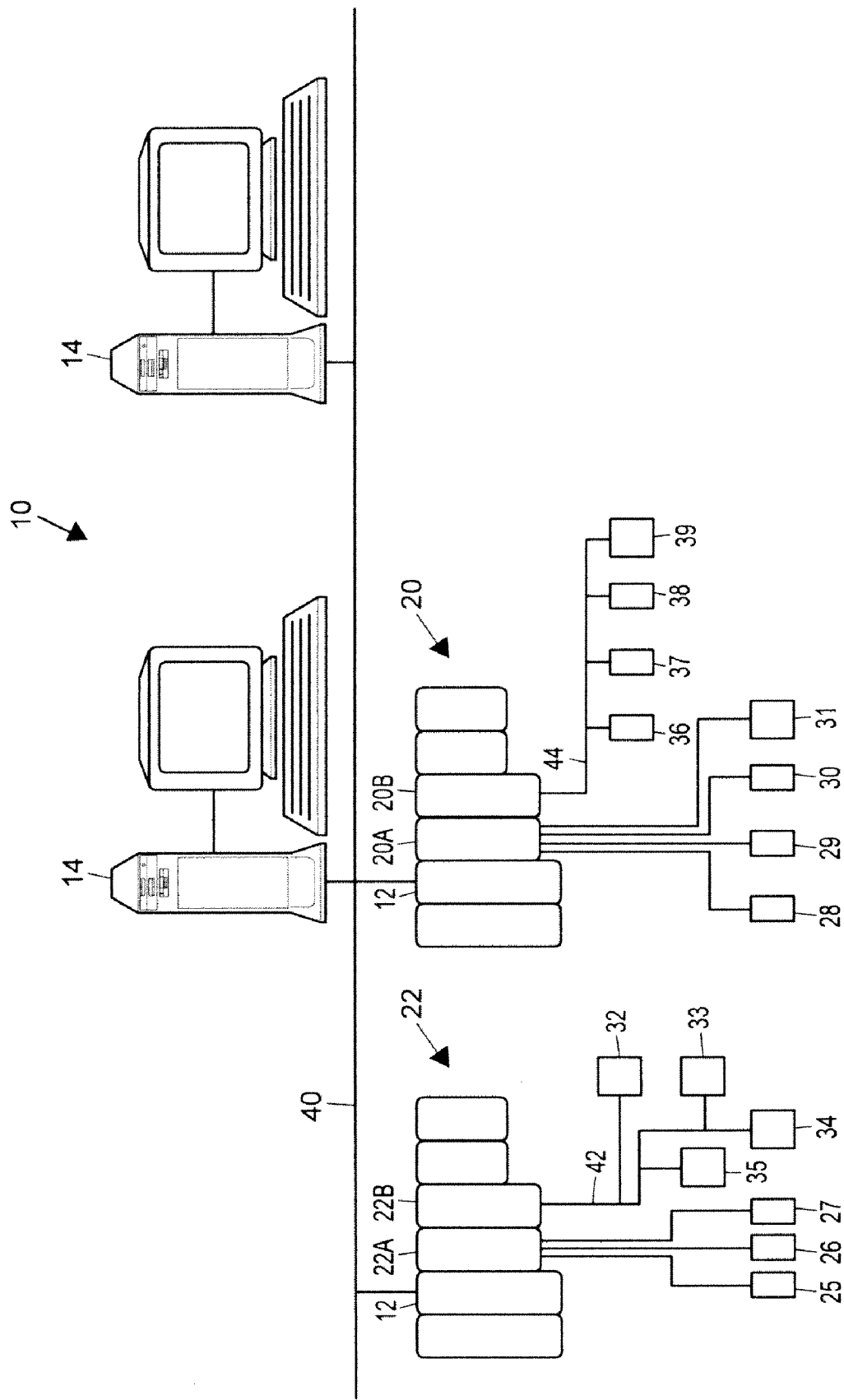
FIG. 1 is a combined block and schematic diagram of a conventional hardwired distributed control system.

FIG. 1 illustrates a typical hardwired distributed process control system 10 which includes one or more process controllers 12 connected to one or more host workstations or computers 14 (which may be any type of personal computer or workstation). The process controllers 12 are also connected to banks of input/output (I/O) devices 20, 22 each of which, in turn, is connected to one or more field devices 25-39. The controllers 12, which may be, by way of example only, DeltaV™ controllers sold by Fisher-Rosemount Systems, Inc., are communicatively connected to the host computers 14 via, for example, an Ethernet connection 40 or other communication link. Likewise, the controllers 12 are communicatively connected to the field devices 25-39 using any desired hardware and software associated with, for example, standard 4-20 ma devices and/or any smart communication protocol such as the Fieldbus or HART protocols. As is generally known, the controllers 12 implement or oversee process control routines stored therein or otherwise associated therewith and communicate with the devices 25-39 to control a process in any desired manner.

The field devices 25-39 may be any types of devices, such as sensors, valves, transmitters, positioners, etc. while the I/O cards within the banks 20 and 22 may be any types of I/O devices conforming to any desired communication or controller protocol such as HART, Fieldbus, Profibus, etc. In the embodiment illustrated in FIG. 1, the field devices 25-27 are standard 4-20 mA devices that communicate over analog lines to the I/O card 22A. The field devices 28-31 are illustrated as HART devices connected to a HART compatible I/O device 20A. Similarly, the field devices 32-39 are smart devices, such as Fieldbus field devices, that communicate over a digital bus 42 or 44 to the I/O cards 20B or 22B using, for example, Fieldbus protocol communications. Of course, the field devices 25-39 and the banks of I/O cards 20 and 22 could conform to any other desired standard(s) or protocols besides the 4-20 mA, HART or Fieldbus protocols, including any standards or protocols developed in the future.

Each of the controllers 12 is configured to implement a control strategy using what are commonly referred to as function blocks, wherein each function block is a part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process control system 10. Of course hybrid and other types of function blocks exist. Groups of these function blocks are called modules. Function blocks and modules may be stored in and executed by the controller 12, which is typically the case when these function blocks are used for, or are associated with standard 4-20 mA devices and some types of smart field devices, or may be stored in and implemented by the field devices themselves, which may be the case with Fieldbus devices. While the control system 10 illustrated in FIG. 1 is described as using function block control-strategy, the control strategy could also be implemented, or designed using other conventions, such as ladder logic, sequential flow charts, etc. and using any desired proprietary or non-proprietary programming language.

As evident from the discussion of FIG. 1, the communications between the host workstations 14 and the controllers 12 and between the controllers 12 and the field devices 25-39 are implemented with hardwired communication connections, including one or more of HART, Fieldbus and 4-20 mA hardwired communication connections. However, as noted above, it is desirable to replace or augment the hardwired communication connections within the process environment of FIG. 1 with wireless communications in an manner that is reliable, that is easy to set up and configure, that provides an operator or other user with the ability to analyze or view the functioning capabilities of the wireless network, etc.

Figure 2:
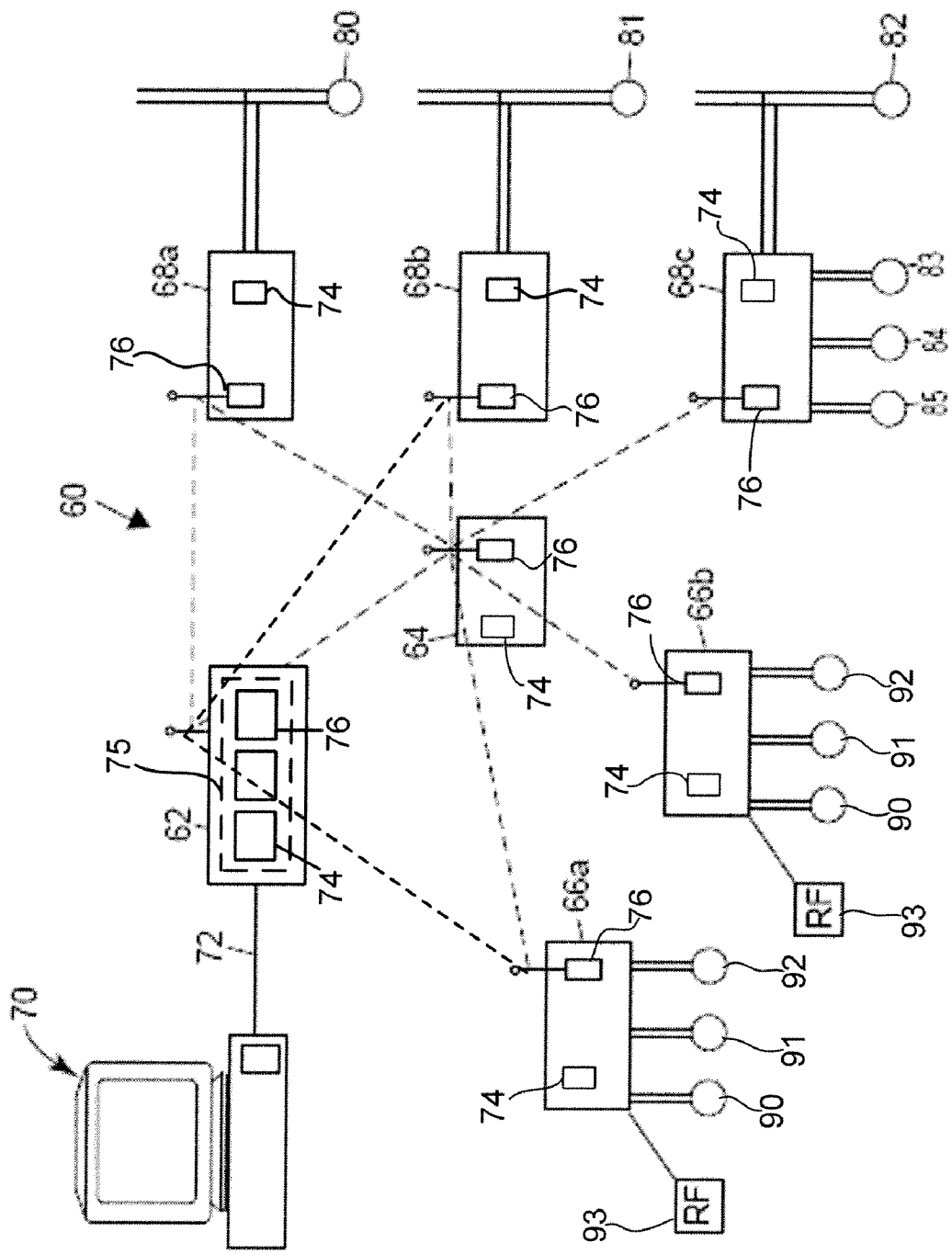
FIG. 2 is a combined block and schematic diagram of a wireless communication network within a portion of a process environment designed in accordance with this disclosure.

FIG. 2 illustrates a wireless communication network 60 that may be used to provide communications between the different devices illustrated in FIG. 1 and, in particular, between the controllers 12 (or the associated I/O devices 22) of FIG. 1 and the field devices 25-39, between the controllers 12 and the host workstations 14 or between the host workstations 14 and the field devices 25-39 of FIG. 1. However, it will be understood that the wireless communication network 60 of FIG. 2 could be used to provide communications between any other types or sets of devices within a process plant or a process environment.

The communication network 60 of FIG. 2 is illustrated as including various communication nodes including one or more base nodes 62, one or more repeater nodes 64, one or more environment nodes 66 (illustrated in FIG. 2 as nodes 66a and 66b) and one or more field nodes 68 (illustrated in FIG. 2 as nodes 68a, 68b and 68c). Generally speaking, the nodes of the wireless communication network 60 operate as a mesh type communication network, wherein each node receives a communication, determines if the communication is ultimately destined for that node and, if not, repeats or passes the communication along to any other nodes within communication range. As is known, any node in a mesh network may communicate with any other node in range to forward communications within the network, and a particular communication signal may go through multiple nodes before arriving at the desired destination.

As illustrated in FIG. 2, the base node 62 includes or is communicatively coupled to a work station or a host computer 70 which may be for example any of the hosts or workstations 14 of FIG. 1. While the base node 62 is illustrated as being linked to the workstation 70 via a hardwired Ethernet connection 72, any other communication link may be used instead. As will be described in more detail later, the base node 62 includes a wireless conversion or communication unit 74 and a wireless transceiver 76 to effect wireless communications over the network 60. In particular, the wireless conversion unit 74 takes signals from the workstation or host 70 and encodes these signals into a wireless communication signal which is then sent over the network 60 via the transmitter portion of the transceiver 76. Conversely, the wireless conversion unit 74 decodes signals received via the receiver portion of the transceiver 76 to determine if that signal is destined for the base node 62a and, if so, further decodes the signal to strip off the wireless encoding to produce the original signal generated by the sender at a different node 64, 66 or 68 within the network 60.

As will be understood, in a similar manner, each of the other communication nodes including the repeater nodes 64, the environmental nodes 66 and the field nodes 68 includes a communication unit 74 and a wireless transceiver 76 for encoding, sending and decoding signals sent via the wireless mesh network 60. While the different types of nodes 64, 66, 68 within the communication network 60 differ in some important ways, each of these nodes generally operates to receive wireless signals, decode the signal enough to determine if the signal is destined for that node (or a device connected to that node outside of the wireless communication network 60), and repeat or retransmit the signal if the signal is not destined for that node and has not previously been transmitted by that node. In this manner, signals are sent from an originating node to all the nodes within wireless communication range, each of the nodes in range which are not the destination node then retransmits the signal to all of the other nodes within range of that node, and the process continues until the signal has propagated to all of the nodes within range of at least one other node.

However, the repeater node 64 operates to simply repeat signals within the communication network 60 to thereby relay a signal from one node through the repeater node 64 to a second node 62, 66 or 68. Basically, the function of the repeater node 64 is to act as a link between two different nodes to assure that a signal is able to propagate between the two different nodes when these nodes are not or may not be within direct wireless communication range of one another. Because the repeater node 64 is not generally tied to other devices at the node, the repeater node 64 only needs to decode a received signal enough to determine if the signal is a signal that has been previously repeated by the repeater node (that is, a signal that was sent by the repeater node at a previous time and which is simply being received back at the repeater node because of the repeating function of a different node in the communication network 60). If the repeater node has not received a particular signal before, the repeater node 64 simply operates to repeat this signal by retransmitting that signal via the transceiver 74 of the repeater node 64.

On the other hand, each of the field nodes 68 is generally coupled to one or more devices within the process plant environment and, generally speaking, is coupled to one or more field devices, illustrated as field devices 80-85 in FIG. 2. The field devices 80-85 may be any type of field devices including, for example, four-wire devices, two-wire device, HART devices, Fieldbus devices, 4-20 mA devices, smart or non-smart devices, etc. For the sake of illustration, the field devices 80-85 of FIG. 2 are illustrated as HART field devices, conforming to the HART communication protocol. Of course, the devices 80-85 may be any type of device, such as a sensor/transmitter device, a valve, a switch, etc. Additionally, the devices 80-85 may be other than traditional field devices such as controllers, I/O devices, work stations, or any other types of devices.

In any event, the field node 68a, 68b, 68c includes signal lines attached to their respective field devices 80-85 to receive communications from and to send communications to the field devices 80-85. Of course, these signal lines may be connected directly to the devices 80-85, in this example, a HART device, or to the standard HART communication lines already attached to the field devices 80-85. If desired, the field devices 80-85 may be connected to other devices, such as I/O devices 20A or 22A of FIG. 1, or to any other desired devices via hardwired communication lines in addition to being connected to the field nodes 68a, 68b, 68c. Additionally, as illustrated in FIG. 2, any particular field node 68a, 68b, 68c may be connected to a plurality of field devices (as illustrated with respect to the field node 68c, which is connected to four different field devices 82-85) and each field node 68a, 68b, 68c operates to relay signals to and from the field devices 80-85 to which it is connected.

In order to assist in the management in the operation of the communication network 60, the environmental nodes 66 are used. In this case, the environmental nodes 66a and 66b includes or is communicatively connected to devices or sensors 90-92 that measure environmental parameters, such as the humidity, temperature, barometric pressure, rainfall, or any other environmental parameters which may effect the wireless communications occurring within the communication network 60. As discussed in more detail below, this information may be useful in analyzing and predicting problems within the communication network, as many disruptions in wireless communications are at least partially attributable to environmental conditions. If desired, the environmental sensors 90-92 may be any kind of sensor and may include, for example, HART sensors/transmitters, 4-20 mA sensors or on board sensors of any design or configuration. Of course, each environmental node 66a, 66b may include one or more environmental sensors 90-92 and different environmental nodes may include the same or different types or kinds of environmental sensors if so desired. Likewise, if desired, one or more of the nodes 66a, 66b may include an electromagnetic ambient noise measurement device 93 to measure the ambient electromagnetic noise level, especially at the wavelengths used by the communication network 60 to transmit signals. Of course, if a spectrum other an RF spectrum is used by the communication network 60, a different type of noise measurement device may be included in one or more of the environmental nodes 66. Still further, while the environmental nodes 66 of FIG. 2 are described as including environmental measurement devices or sensors 90-93, any of the other nodes 68 could include those measurement devices so that an analysis tool may be able to determine the environmental conditions at each node when analyzing the operation of the communication network 60.

Using the communication system 60 of FIG. 2, an application running on the workstation 70 can send packets of data to and receive packets of wireless data from the wireless base card 74 residing in a standard controller 75 at the base node 62. This controller 75 may be, for example, a DeltaV controller and the communications may be the same as with a standard I/O card via the Ethernet connection to the DeltaV controller. The I/O card in this case includes a wireless base card 74, though as far as the controller and PC Application goes, it appears as a standard HART I/O card.

In this case, the wireless card 74 at the base node 62 encodes the data packet for wireless transmission and the transceiver 76 as the base node 62 transmits the signal. FIG. 2 illustrates that the transmitted signal may go directly to some of the field nodes such as nodes 68a and 68b, but may also propagate to other field nodes, such as nodes 68c, via the repeater node 64. In the same manner, signals created at and propagated by the field nodes 68 may go directly to the base node 60 and other field nodes 66 or may be transmitted through other nodes such as the repeater node 64 or another field node before being transmitted to the base node 62. Thus, the communication path over the wireless network 60 may or may not go through a repeater node 64 and, in any particular case, may go through numerous nodes before arriving at the destination node. If a sending node is in direct communication reach of the base unit 62, then it will exchange data directly. Whether or not the packets pass through a repeater node 64 is completely transparent to the end user, or even to the card firmware.

It will be noted that FIG. 2 is a schematic diagram and the placement of the environmental nodes 66a, 66b relative to the field nodes 68a-68c are not intended to be relative to their actual placement in an actual process control area. Rather, the environmental nodes 66a, 66b (and other environmental nodes not pictured or a single environmental node) are intended to be placed about the process control area in a logical and strategic manner as shown in FIG. 7. In other words, environmental nodes 66 should be placed at spaced apart location, such as at opposing ends of large obstacles or pieces of equipment or near roadways where interference from moving vehicles may be present. Also, environmental nodes should be placed both indoors and outdoors if applicable. The network of environmental nodes 66 is intended to be used by the base nodes 62 and host 70 as a means for monitoring the operation of the wireless network 60 and modifying the operation of the network 60 by increasing or decreasing signal strength, gain, frequency etc.

It will be noted that the field nodes 68 are placed at or near various process stations. The node 68 may be important safety devices or maybe used to monitor and/or control various processes. Further, more than one repeater node 64 may be used and, in fact, FIG. 2 is but one example as it may be determined that it only single environmental node 66 is necessary, that more than one or no repeater nodes 64 are needed and that fewer than three or more than three field nodes 68 are necessary.

Turning to FIGS. 3 and 4, it is anticipated that the wireless network 60 of FIG. 2 may need to be switched back and forth between mesh and point-to-point communication modes. FIG. 3 illustrates a network 100 with a base node 101 in communication with repeater nodes 102a, 102b, 102c. The repeater nodes 102a-102c are, in turn, in communication with a plurality or a cluster of either environmental nodes, field nodes or combination of the two as shown generally at 104. A point-to-point wireless communication system for FIG. 3 is shown in solid line while an alternative mesh configuration is shown in solid line.

Turning to FIG. 4, a switch device 105 is shown schematically which may be disposed in the base mode 101 in addition to the wireless and transceiver (not shown). The switch 105 is intended to convert the network 100 from a mesh wireless network as shown by the phantom lines in FIG. 3 to a point-to-point wireless network as shown by way of example in the solid line of FIG. 3. Of course, the point-to-point communications can be configured in any manner and the solid lines shown in FIG. 3 are but one example. The switch device 105 as shown in FIG. 4 can include an electronic switch element 106 that shifts the device 105 between a mesh wireless transceiver 76a and a point-to-point wireless transceiver 76b.

Figures 5, 6:
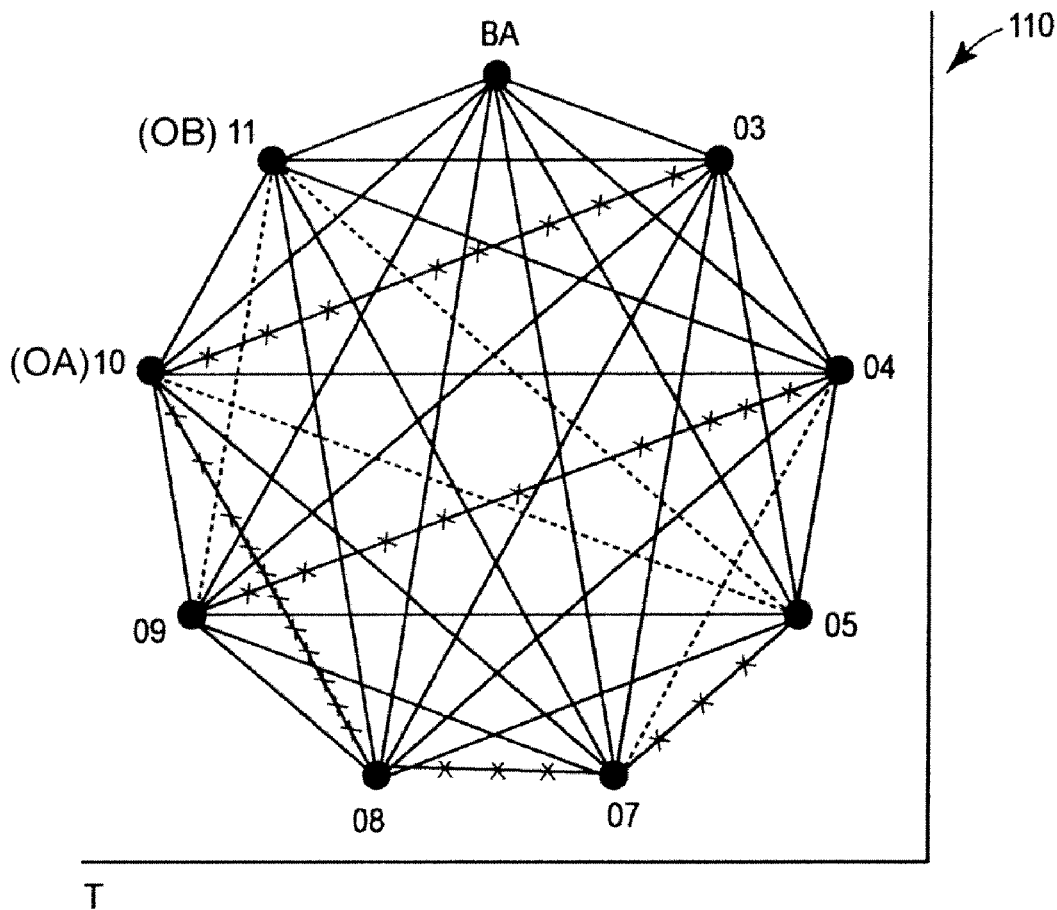
FIG. 5 is an example of a geometric topology screen display created by a wireless network analysis tool illustrating the wireless communications between different devices within the wireless communication system designed in accordance with this disclosure.
FIG. 6 is an example screen display presented in tabular form and created by a wireless network analysis tool illustrating the number of hops or the hop count between each of the wireless communication devices within a disclosed wireless communication system.

As noted above, the disclosed network 60 includes a base node 62 and host 70 that may be programmed to provide a variety of graphically interfaces that will be useful to the operator. Examples of such graphical interfaces are shown in FIGS. 5-9. Turning to FIG. 5, a geometric topology screen display 110 is disclosed which illustrates a wireless network between a base node BA and a plurality of other nodes which may be one or more repeater nodes, field nodes and environmental nodes numbered in FIG. 5 as 03, 04, 05, 06, 07, 08, 09, 10 (0A), and 11 (0B). The topology display 110 of FIG. 5 illustrates a successful communication between two nodes with a solid, dark line, one example of which is the communication between the base node BA and the node 7. A successful communication in one direction only is illustrated by a lighter line with cross hatches, one example of which is the line between the nodes 03 and 10 (0A). An unsuccessful communication is indicated by a dashed or phantom line, one example of which is the lack of communication illustrated by the dashed line between nodes 05 and 11 (0B). FIG. 5 also illustrates the "hop count" between nodes. For example, looking at nodes 04 and 07, the dashed or phantom line between nodes 04 and 07 of FIG. 5 make it clear that there is no direct wireless communication between nodes 04 and 07 while there is communication between nodes 04 and 05 and one-way communication between nodes 05 and 07. Thus, for one-way communication between nodes 04 and 07, there is a hop count of 2 (node 04 to node 05 and node 05 to node 07). Alternatively, for two-way communication between nodes 04 and 07, there is also a hop count of 2 (node 07 to node 03 and node 03 to node 04). Obviously, the lower the hop count the better and the more reliable the communication.

The hop counts for the network shown in FIG. 5 are shown in tabular form in FIG. 6. The nodes labeled 10 and 11 in FIG. 5 are also indicated as 0A and 0B in FIG. 6. The base node BA communicates directly with nodes 03 through 0B and therefore the hop count between the base node BA and any one of 03 through 0B is one is indicated in the top row of the table shown in FIG. 6. Turning to the second row of the table of FIG. 6, it will be noted that the hop count between node 03 and any of the other nodes is also 1 as node 3 of FIG. 5 includes no dashed lines emanating from it. However, turning to the third row of the table of FIG. 6 and referring to FIG. 5, it will be noted that node 04 includes a dashed line extended between node 04 and node 07 and therefore direct communication between node 04 and node 07 is not possible. Thus, to connect from node 04 to node 07, the communication precedes through node 05 for a hop count of 2. Still further, because there is a light colored cross-hatched line between node 04 and node 09 in FIG. 5, direct two-way communication between node 04 and 09 is not possible. Accordingly, for two-way communication between nodes 04 and 09, the communication must pass through node 08 as indicated in the table of FIG. 6. All of the entries that are circled in FIG. 6 indicate a hop count of 2.

Turning to FIG. 7, a topology map similar to that shown in FIG. 5 is illustrated as an overlay of a map for an actual process environment. Specifically, each point is the location of 1 of the 9 nodes show in FIG. 5 and listed in the table of FIG. 6. FIG. 7 provides the operator with an opportunity to view the wireless connectivities within the context of the actual operating environment. Global positioning system reference points are indicated at 111, 112 so actual distances between the nodes can be determined.

Turning to FIG. 8, the field devices 80-85 and 90-93 may appear to the base node 62 or host 70 as a standard HART device. This enables standard applications such as AMS software to run seamlessly on top of the wireless network 60. To utilize the AMS software, the wireless field nodes 66 and 68 need to know how to route messages. This is accomplished by utilizing a routing map 120 as illustrated in FIG. 8. This map 120 is stored in the nonvolatile memory of the base unit 62, but also could be stored in the memory of the host 70. The actual routing takes advantage of incorporating a base card that is identical to an 8 channel HART card. The routing tool then maps 8 virtual HART channels to remote field nodes and their channels. FIG. 8 illustrates a mapping configuration for 8 different devices. Each Field type wireless node may include 4 different HART channels, though the field device will have one unique ID. The actual target channel is embedded in the wireless packet. Each ID for each wireless unit is based on 2 bytes. The first byte is the network number and correlates to an actual radio channel in the wireless interface. The number of the first byte can range from 1 to 12. The second byte is the identification of the node in the network and can range from 1 to 15. When a node is initialized for a first time, its default address is 010F, which mean network 1, address 15. The exception to this address scheme is the base unit which always has BA as its first byte, the second byte representing which network the device is in.

Figure 9:
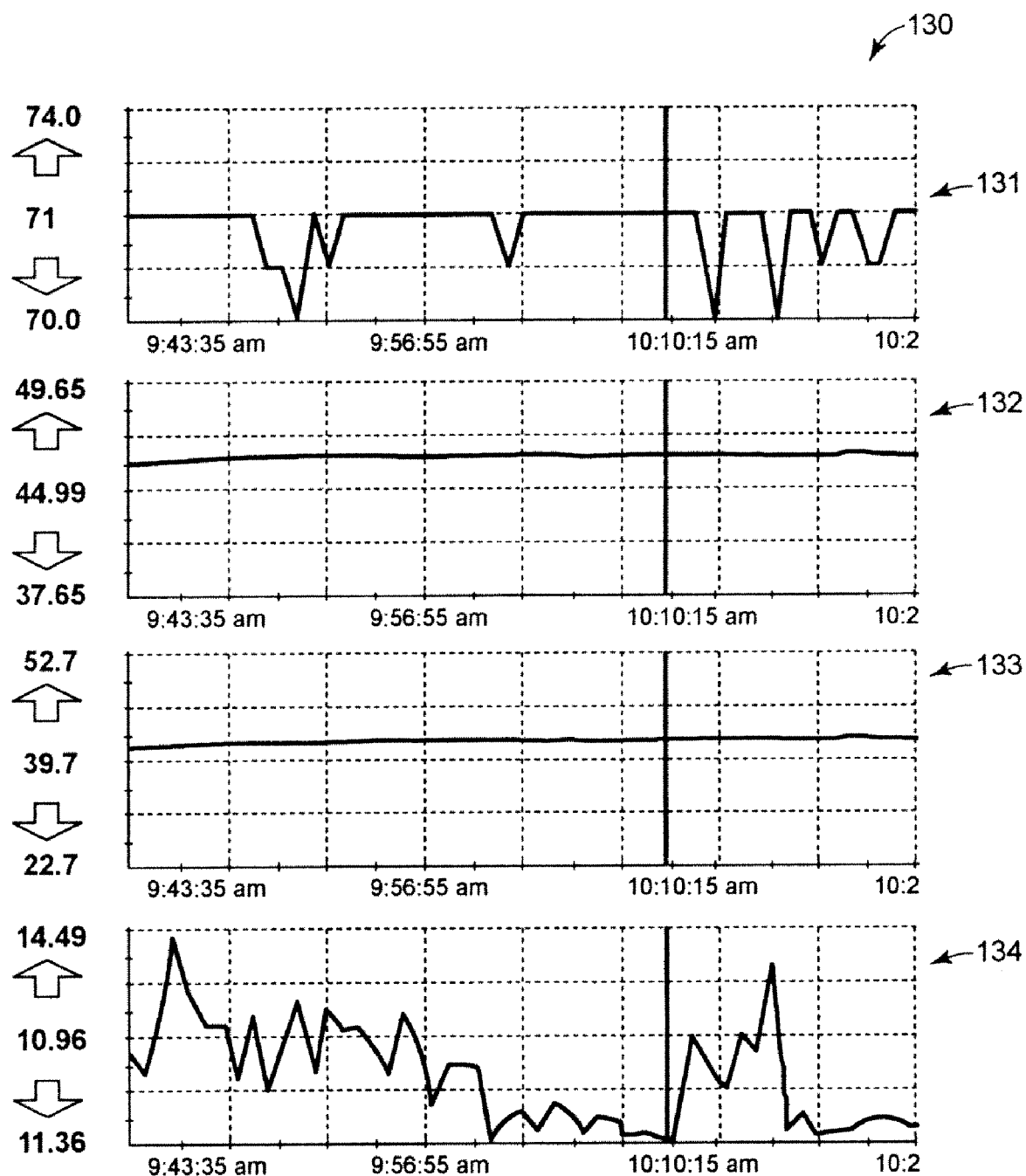
FIG. 9 is an example screen display created by a wireless network analysis tool illustrating graphical displays of information about the wireless communications between different devices within the wireless communication system to enable a user or operator to analyze the operational capabilities and parameters of the wireless communication network.

Turning to FIG. 9, another graphical presentation 130 for display at the host 70 (FIG. 1) is shown. 4 graphs are shown, one on top of each other with time being plotted on the x-axes. The top graph 131 plots a total hop count for the entire system which, as shown, averages about 72 or slightly less. An increase in the hop count would provide a warning to the operator. The other graphs in FIG. 9 provide environmental information from the environmental node 66 shown in FIG. 2. The graph 132 provides a reading of barometric pressure; the graph 133 provides a reading of humidity; and the graph 134 provides a reading of the general RF background noise within the operating frequency band. Other environmental indications not presented in FIG. 9 could be temperature and rainfall.

Figure 10:
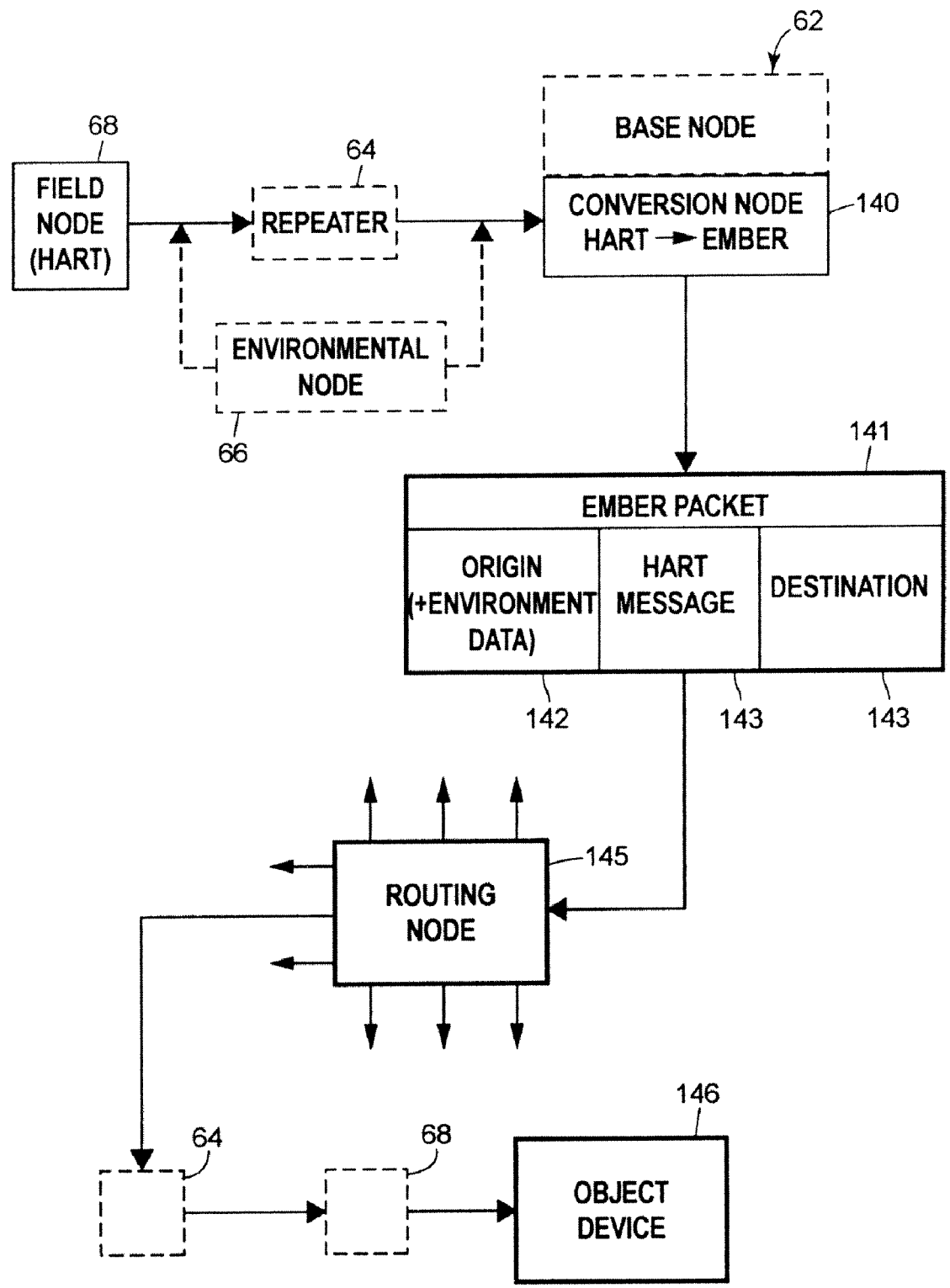
FIG. 10 is a block diagram of a wireless communication device that implements a HART communication protocol wirelessly using a second communication protocol, e.g. the EMBER® protocol.

Turning to FIG. 10, it will be noted that many of the devices 80-85 shown in FIG. 2 would be HART field devices, and therefore the field node 68 will be sending a HART signal to either a repeater node 64 or directly to a conversion node 140 which, in the embodiment shown in FIG. 10, may be a separate element or may comprise part of the base node 62. A HART signal may also be sent from an environmental node 66 as shown. The conversion node 140 includes software to convert the HART signal to a different protocol, e.g., the EMBER protocol used with low-power wireless networking software and radio technology. See http://www.ember.com/. Of course, other protocols are available and will be apparent to those skilled in the art. The conversion node 140 converts the HART signal to an EMBER data packet at 141. The data packet includes an origin indication 142 and a destination indication 143 which is determined by software either in the base node 62 or in the conversion node 140. The HART message 143 is sandwiched between the origin data 142 and destination data 143. The signal is then sent to a routing node 145 which determines, from the destination information 143, which object device 146 to send the data to. The routing node 145 then transmits the data through one or more repeaters 64 and/or field nodes 68 to the object device 146. One type of software that could be used to convert the field device signal from one protocol (HART) to another protocol is the GTS software sold by Acugen (http://www.acugen.com/jts.htm).

Although the present invention has been described with reference to preferred embodiments, workers skilled in the art will recognize that changes may be made in form and detail without departing from the spirit and scope of the invention.

What is claimed is:

1. A process control wireless communication network comprising:
   a plurality of nodes, including a base node, a field node, and an environmental node; and
   a host,
   the base node communicatively coupled to the host,
   the base node, the field node and the environmental node each including a wireless transceiver,
   the wireless transceivers of the base node, the field node and the environmental node effecting wireless communications amongst the base node, the field node and the environmental node,
   the field node including at least one field device providing process control data, the environmental node comprising at least one sensor device providing environmental data regarding one or more environmental factors that may affect operation of the wireless communication network, and
   wherein the host includes a system to determine one or more communication network performance factors associated with the current operation of the wireless communication network that may be effected by the one or more environmental factors.

2. The network of claim 1 further comprising a repeater node including a further wireless transceiver, the repeater node effecting wireless communications between two or more of the base node, the field node and the environmental node.

3. The network of claim 1 wherein the environmental node includes one or more sensor devices, each of the one or more sensor devices providing data related to at least one of a temperature, a barometric pressure, a humidity, a rainfall or a radio frequency ambient noise.

4. The network of claim 1 wherein each field device of the field node is a HART protocol device.

5. The network of claim 1 wherein each field device of the field node is a Fieldbus™ protocol device.

6. The network of claim 1 further comprising a plurality of environmental nodes located within a process area for communicating environmental data associated with different locations within the process area.

7. The network of claim 1 wherein the base node, the environmental node and the field node form a mesh wireless communications network.

8. The network of claim 1 wherein the base node, the environmental node and the field node form a point-to-point wireless communications network.

9. The network of claim 1 further comprising a switch device to convert the base node, the environmental node and the field node from a mesh wireless communications network to a point-to-point wireless communications network or vice versa.

10. The network of claim 1 wherein the system of the host includes a monitor and a processor, the processor being programmed to provide a topology screen display on the monitor illustrating information about one or more wireless communications between the base node, the field node, and the environmental node of the network.

11. The network of claim 10 wherein the topology screen display also illustrates structural features of a process area in which the base node, the field node and the environmental node are disposed.

12. The network of claim 1 wherein the host includes a monitor and a processor, the processor being programmed to provide a screen display on the monitor listing a hop count between two or more of the field node and the environmental node and the base node of the network.

13. The network of claim 1 wherein at least one of the field devices communicates device data using the HART communication protocol and the device data communicated is converted from the HART communication protocol to a different protocol by one of the host or the base node.

14. The network of claim 1 wherein the environmental node and the field node are integrated in a common physical node.

15. The network of claim 1, wherein the system to determine the one or more communication network performance factors associated with the current operation of the wireless communication network includes a display monitor and a display program that operates to display the one or more communication network performance factors on the display monitor.

16. The network of claim 15, wherein the one or more communication network performance factors includes a hop count between two different ones of the plurality of nodes.

17. The network of claim 15, wherein the one or more communication performance factors includes an indication of a signal strength of a signal between two different ones of the plurality of nodes.

18. The network of claim 15, wherein the one or more communication performance factors includes an indication of one or more wireless communication paths being used between various ones of the plurality of nodes.

19. The network of claim 18, wherein the system to determine the one or more communication performance factors displays the one or more wireless communication paths being used between various ones of the plurality of nodes in conjunction with indications of physical structural elements within the process plant in which the one or more wireless communication paths are being used.

20. The network of claim 15, wherein the one or more communication performance factors includes an indication of a frequency used to establish a communication path between two or more of the plurality of nodes.

21. The network of claim 15, wherein the system to determine the one or more communication performance factors displays the one or more communication performance factors versus time.

22. The network of claim 21, wherein the system to determine the one or more communication performance factors displays the one or more communication performance factors versus time in conjunction with indications of the environmental data over a common period of time.

23. The network of claim 22, wherein the one or more environmental factors includes at least one of a temperature, a barometric pressure, a humidity, a rainfall or a radio frequency ambient noise.

24. A process control wireless communication network comprising:
 a base node, a field node, an environmental node and a host, the base node communicatively coupled to the host,
 the base node, the field node and environmental node each including a wireless transceiver,
 the wireless transceivers of the base node, the field node and the environmental node effecting both mesh and point-to-point wireless communications amongst the base node, the field node and the environmental node,
 the network further comprising a switch to convert the base node, the environmental node and the field node from a mesh wireless communications network to a point-to-point wireless communications network and vice versa.

25. The network of claim 24 wherein the field node includes at least one field device providing process control data, and the environmental node includes at least one sensor device that produces data regarding one or more environmental factors that may affect the wireless communications of the network.

26. The network of claim 24 further comprising a repeater node including a wireless transceiver, the repeater node effecting wireless communications between two or more of the base node, the field node and the environmental node.

27. The network of claim 24 wherein the host comprises a monitor and a processor, the processor being programmed to provide a topology screen display on the monitor illustrating wireless communications between two or more of the base node the field node, and the environmental node of the network.

28. The network of claim 27 wherein the topology screen display also illustrates structural features of a process area in which the base node, the field node and the environmental node are disposed.

29. The network of claim 28 wherein the processor is also programmed to provide a screen display on the monitor indicating a hop count between two or more of the field node and the environmental node and the base node of the network.

30. A process control wireless communication network comprising:
 a base node, a field node, an environmental node and a host, the base node communicatively coupled to the host, the base node, the field node and the environmental node each including a wireless transceiver,
 the wireless transceivers of the base node, the field node and the environmental node effecting wireless communications amongst the base node, the field node and the environmental node,
 the field node comprising at least one field device providing process control data,
 the environmental node comprising at least one sensor device providing data regarding one or more environmental factors that may affect the wireless communications of the network,
 wherein at least one of the field device or the sensor device communicates using the HART communication protocol and at least some of the data communicated by the at least one of the field device or the sensor device is converted from the HART communication protocol to a different protocol by a conversion node to produce converted data,
 the converted data being communicated to a routing node for determining an object device intended to receive the converted data and for sending the converted data to the object device.

31. The network of claim 30 wherein the conversion node is part of the base node.

32. The network of claim 30 wherein the conversion node is part of the host.

33. A method for monitoring a wireless process control network comprising:
 receiving environmental data from one or more environmental field devices of an environmental node disposed within the process control network,
 wirelessly transmitting the environmental data to a base node disposed within the process control network,
 transmitting the environmental data to a host,
 interpreting the environmental data at the host,
 sending a command from the host to the base node to adjust at least one operating parameter of the wireless process control network based on the environmental data,
 transmitting the command from the base node to at least one field node having at least one field device thereby affecting the manner in which data is communicated through the wireless communication network.

34. The method of claim 32 wherein the environmental data is data selected from the group consisting of a temperature, a barometric pressure, a humidity, a rainfall and a radio frequency ambient noise.

35. A wireless communication network disposed in a process plant, comprising:
 a host device including a display monitor and a processor and a memory;
 a plurality of communication nodes, wherein at least one of the plurality of communication nodes is communicatively coupled to the host device, and wherein each of the plurality of communication nodes includes a wireless transceiver so that the wireless transceivers of the plurality of communication nodes implement wireless communications amongst the plurality of communication nodes;
 one or more field devices that each performs a process control action within the process plant, each of the one or more field devices being communicatively coupled to at least one of the plurality of communication nodes; and
 a program stored in the memory of the host device which, when executed on the processor of the host device, collects data related to the operation of wireless communications between the plurality of communication nodes and displays information on the display monitor related to the operation of the wireless communications between the plurality of communication nodes.

36. The wireless communication network of claim 35, wherein the program operates to display one or more wireless communication network performance factors on the display monitor.

37. The wireless communication network of claim 36, wherein the one or more communication network performance factors includes a hop count between two different ones of the plurality of communication nodes.

38. The wireless communication network of claim 36, wherein the one or more communication performance factors includes an indication of a signal strength of a signal between two different ones of the plurality of communication nodes.

39. The wireless communication network of claim 36, wherein the one or more communication performance factors includes an indication of one or more wireless communication paths being used between various ones of the plurality of communication nodes.

40. The wireless communication network of claim 39, wherein the program displays the one or more wireless communication paths being used between various ones of the plurality of communication nodes in conjunction with indications of physical structural elements within the process plant in which the one or more wireless communication paths are being used.

41. The wireless communication network of claim 36, wherein the one or more communication performance factors includes an indication of a frequency used to establish a communication path between two or more of the plurality of communication nodes.

42. The wireless communication network of claim 36, wherein the program displays the one or more communication performance factors versus time.

43. The wireless communication network of claim 36, wherein the program displays the one or more communication performance factors versus time in conjunction with indications of one or more measured environmental factors over the same time.

44. The wireless communication network of claim 43, wherein the one or more measured environmental factors includes at least one of a temperature, a barometric pressure, a humidity, a rainfall or a radio frequency ambient noise.

45. The wireless communication network of claim 35, further comprising a controller communicatively coupled to one of the plurality of communication nodes to receive data from one or more of the field devices and to generate a control signal to be used to control at least one of the one or more field devices.

* * * * *

UNITED STATES PATENT AND TRADEMARK OFFICE
CERTIFICATE OF CORRECTION

PATENT NO.        : 7,436,797 B2
APPLICATION NO.   : 11/156215
DATED             : October 14, 2008
INVENTOR(S)       : John R. Shepard et al.

It is certified that error appears in the above-identified patent and that said Letters Patent is hereby corrected as shown below:

At Column 6, line 33, "comprising" should be -- comprise --.

At Column 9, line 40, "control-strategy" should be -- control strategy --.

At Column 9, line 41, "implemented," should be -- implemented --.

Signed and Sealed this

Fourteenth Day of April, 2009

JOHN DOLL
*Acting Director of the United States Patent and Trademark Office*